(12) United States Patent
Pequeno et al.

(10) Patent No.: US 7,754,834 B2
(45) Date of Patent: Jul. 13, 2010

(54) BULK DENSITY PROMOTING AGENTS IN A GAS-PHASE POLYMERIZATION PROCESS TO ACHIEVE A BULK PARTICLE DENSITY

(75) Inventors: R. Eric Pequeno, Baytown, TX (US); Robert O. Hagerty, La Porte, TX (US); Bruce J. Savatsky, Kingwood, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 12/291,589

(22) Filed: Nov. 12, 2008

(65) Prior Publication Data

US 2009/0137756 A1 May 28, 2009

Related U.S. Application Data

(63) Continuation-in-part of application No. PCT/US2007/009144, filed on Apr. 12, 2007.

(51) Int. Cl.
C08F 4/06 (2006.01)
C08F 210/08 (2006.01)
(52) U.S. Cl. ...................... 526/126; 526/348
(58) Field of Classification Search ............... 526/126, 526/348
See application file for complete search history.

(56) References Cited

U.S. PATENT DOCUMENTS

| | | | | |
|---|---|---|---|---|
| 3,709,853 A | 1/1973 | Karapinka et al. | ......... | 526/130 |
| 3,709,954 A | 1/1973 | Karol et al. | ......... | 585/520 |
| 4,077,904 A | 3/1978 | Noshay et al. | ......... | 502/152 |
| 4,102,817 A | 7/1978 | Throckmorton et al. | ..... | 502/117 |
| 4,155,880 A | 5/1979 | Throckmorton et al. | ..... | 502/117 |
| 4,182,814 A | 1/1980 | Bernemann et al. | ......... | 526/92 |
| 4,376,062 A | 3/1983 | Hamer et al. | ......... | 502/9 |
| 4,379,758 A | 4/1983 | Wagner et al. | ......... | 502/104 |
| 4,472,559 A | 9/1984 | Maehara et al. | ......... | 526/92 |
| 4,508,842 A | 4/1985 | Beran et al. | ......... | 502/112 |
| 4,530,914 A | 7/1985 | Ewen et al. | ......... | 502/113 |
| 4,543,399 A | 9/1985 | Jenkins, III et al. | ......... | 526/70 |
| 4,588,790 A | 5/1986 | Jenkins, III et al. | ......... | 526/70 |
| 4,665,047 A | 5/1987 | Slaugh et al. | ......... | 502/104 |
| 4,752,597 A | 6/1988 | Turner | ......... | 502/104 |
| 4,975,485 A | 12/1990 | Sato et al. | ......... | 525/53 |
| 4,994,534 A | 2/1991 | Rhee et al. | ......... | 526/88 |
| 5,028,670 A | 7/1991 | Chinh et al. | ......... | 526/73 |
| 5,218,071 A | 6/1993 | Tsutsui et al. | ......... | 526/348 |
| 5,237,025 A | 8/1993 | Benham et al. | ......... | 526/114 |
| 5,272,236 A | 12/1993 | Lai et al. | | |
| 5,278,272 A | 1/1994 | Lai et al. | | |
| 5,317,036 A | 5/1994 | Brady, III et al. | ......... | 523/223 |
| 5,350,807 A | 9/1994 | Pettijohn et al. | ......... | 525/240 |
| 5,352,749 A | 10/1994 | DeChellis et al. | ......... | 526/68 |
| 5,376,742 A | 12/1994 | Krause | ......... | 526/68 |
| 5,405,922 A | 4/1995 | DeChellis et al. | ......... | 526/68 |
| 5,436,304 A | 7/1995 | Griffin et al. | ......... | 526/68 |
| 5,453,471 A | 9/1995 | Bernier et al. | ......... | 526/68 |
| 5,462,999 A | 10/1995 | Griffin et al. | ......... | 526/68 |
| 5,527,752 A | 6/1996 | Reichle et al. | ......... | 502/117 |
| 5,541,270 A | 7/1996 | Chinh et al. | ......... | 526/68 |
| 5,616,661 A | 4/1997 | Eisinger et al. | ......... | 526/88 |
| 5,668,228 A | 9/1997 | Chinh et al. | ......... | 526/67 |
| 5,804,677 A | 9/1998 | Chinh et al. | ......... | 526/68 |
| 5,834,571 A | 11/1998 | Bernier et al. | ......... | 526/68 |
| 5,969,061 A | 10/1999 | Wonders et al. | ......... | 526/68 |
| 6,022,933 A | 2/2000 | Wright et al. | ......... | 526/68 |
| 6,090,893 A | 7/2000 | Harlin et al. | ......... | 525/240 |
| 6,204,349 B1 | 3/2001 | Shinohara et al. | | |
| 6,242,543 B1 | 6/2001 | Follestad et al. | ......... | 526/118 |
| 6,262,192 B1 | 7/2001 | Wu | ......... | 526/67 |
| 6,271,323 B1 | 8/2001 | Loveday et al. | ......... | 526/161 |
| 6,271,325 B1* | 8/2001 | McConville et al. | ......... | 526/217 |
| 6,274,684 B1 | 8/2001 | Loveday et al. | ......... | 526/114 |
| 6,300,439 B1 | 10/2001 | McConville | ......... | 526/161 |
| 6,380,341 B1 | 4/2002 | Waymouth et al. | | |
| 6,384,157 B1 | 5/2002 | Cai et al. | ......... | 526/88 |
| 6,388,017 B1 | 5/2002 | McDaniel et al. | ......... | 525/240 |
| 6,455,660 B1 | 9/2002 | Clutton et al. | ......... | 526/352 |
| 6,462,135 B1 | 10/2002 | Rohde et al. | ......... | 525/191 |
| 6,489,427 B1 | 12/2002 | Clutton et al. | ......... | 526/352 |
| 6,525,148 B1 | 2/2003 | McDaniel et al. | ......... | 526/111 |
| 6,716,924 B2 | 4/2004 | Tsutsui et al. | ......... | 525/193 |
| 6,759,489 B1 | 7/2004 | Turkistani | ......... | 526/68 |
| 6,770,715 B2 | 8/2004 | Garrison et al. | ......... | 525/240 |
| 6,809,154 B2 | 10/2004 | Lindahl et al. | ......... | 525/191 |
| 6,841,621 B2 | 1/2005 | Krumpel et al. | ......... | 525/191 |
| 6,864,332 B2 | 3/2005 | Braganca et al. | ......... | 526/68 |
| 6,867,278 B2 | 3/2005 | McDaniel et al. | | |
| 6,875,835 B2 | 4/2005 | McDaniel et al. | ......... | 526/348 |
| 6,946,521 B2 | 9/2005 | Miserque et al. | ......... | 525/191 |
| 6,953,831 B2 | 10/2005 | Ishihama et al. | ......... | 526/352 |
| 7,304,118 B2 | 12/2007 | Lee et al. | | |
| 7,321,015 B2 | 1/2008 | Hoang et al. | ......... | 526/73 |
| 7,411,023 B2 | 8/2008 | Palmlof | ......... | 525/191 |

(Continued)

FOREIGN PATENT DOCUMENTS

EP            050477 A1    4/1982

(Continued)

OTHER PUBLICATIONS

ASTM Designation: D2873-94 (Reapproved 1999).

(Continued)

*Primary Examiner*—Ling-Siu Choi
*Assistant Examiner*—Sonya Wright

(57) ABSTRACT

Disclosed herein is a gas phase polymerization process including the steps of passing a recycle stream through a fluidized bed in a gas phase fluidized bed reactor in the presence of a bulk density promoting agent, wherein the bulk density promoting agent is of a saturated hydrocarbon and/or a non-polymerizable unsaturated hydrocarbon having 6 or more carbon atoms; polymerizing at least one alpha-olefin monomer in the presence of a catalyst to produce an alpha-olefin polymer; and controlling an amount of the bulk density promoting agent in the reactor such that a bulk density of the alpha-olefin polymer discharged from the reactor is greater than or equal to about 480 kg/m$^3$.

22 Claims, 3 Drawing Sheets

U.S. PATENT DOCUMENTS

| | | |
|---|---|---|
| 2003/0027946 A1 | 2/2003 | Pon .............................. 526/68 |
| 2003/0153695 A1 | 8/2003 | Braganca et al. .............. 526/68 |
| 2003/0208010 A1 | 11/2003 | Lindroos et al. |
| 2005/0137342 A1 | 6/2005 | Krishnaswamy et al. .... 525/240 |
| 2005/0137364 A1 | 6/2005 | Cai et al. ....................... 526/68 |
| 2005/0154159 A1 | 7/2005 | DesLauriers et al. ........ 526/156 |
| 2005/0245689 A1 | 11/2005 | Krishnaswamy et al. .... 525/240 |
| 2005/0255265 A1 | 11/2005 | Gorgerin ..................... 428/357 |
| 2005/0267268 A1 | 12/2005 | Hendrickson ................. 526/67 |
| 2005/0267269 A1 | 12/2005 | Hagerty et al. ................. 526/68 |
| 2006/0079656 A1 | 4/2006 | DesLauriers et al. |
| 2006/0241256 A1 | 10/2006 | Baann et al. ................. 526/170 |
| 2007/0003724 A1 | 1/2007 | Johansson et al. |
| 2007/0010626 A1 | 1/2007 | Shankernarayanan et al. ........................... 525/240 |
| 2007/0043182 A1 | 2/2007 | Martin et al. ........................... 526/119 |
| 2007/0078239 A1 | 4/2007 | Cai et al. ....................... 526/68 |
| 2007/0197716 A1 | 8/2007 | Krishnaswamy et al. .... 524/543 |
| 2007/0207281 A1 | 9/2007 | Backman et al. ............. 428/347 |
| 2007/0265400 A1 | 11/2007 | Fischbuch et al. ............. 526/68 |
| 2007/0276111 A1 | 11/2007 | Goldberg et al. ............. 526/352 |
| 2007/0287798 A1 | 12/2007 | Lambert et al. ................ 525/53 |
| 2008/0004411 A1 | 1/2008 | Sukhadia et al. |
| 2008/0014425 A1 | 1/2008 | Guenther et al. ............. 428/220 |
| 2008/0015318 A1 | 1/2008 | Guenther et al. |
| 2008/0051538 A1 | 2/2008 | Coffy et al. .................. 526/170 |
| 2008/0097054 A1 | 4/2008 | Amos et al. .................. 526/135 |
| 2008/0139749 A1 | 6/2008 | Lehtinen et al. ............. 525/240 |
| 2008/0146714 A1 | 6/2008 | Posch et al. .................. 524/423 |
| 2008/0196922 A1 | 8/2008 | Van Marion et al. ........ 174/110 |
| 2008/0241510 A1 | 10/2008 | Van Marion et al. ........ 428/327 |

FOREIGN PATENT DOCUMENTS

| | | |
|---|---|---|
| EP | 0121740 | 5/1991 |
| EP | 0227838 | 8/1991 |
| EP | 0134388 | 7/1993 |
| EP | 0339571 | 2/1994 |
| EP | 0412750 | 2/1995 |
| EP | 0328348 | 12/1995 |
| EP | 0760278 | 3/1997 |
| EP | 0717755 | 2/1999 |
| EP | 0586357 | 11/1999 |
| EP | 0602716 | 12/1999 |
| EP | 0700769 | 3/2000 |
| EP | 0676418 | 7/2000 |
| EP | 1054024 | 11/2000 |
| EP | 1110975 | 6/2001 |
| EP | 0747402 | 12/2001 |
| EP | 1195385 | 4/2002 |
| EP | 0690079 | 7/2002 |
| EP | 0942011 | 5/2003 |
| EP | 1013670 | 4/2004 |
| EP | 1655339 | 5/2006 |
| EP | 1655335 | 12/2006 |
| EP | 1655336 | 1/2007 |
| EP | 1655338 | 1/2007 |
| EP | 1767556 | 3/2007 |
| EP | 1655333 | 9/2007 |
| EP | 1655337 | 1/2008 |
| EP | 1884527 | 2/2008 |
| EP | 1712574 | 3/2008 |
| EP | 1909013 | 4/2008 |
| EP | 1909014 | 4/2008 |
| EP | 1764389 | 5/2008 |
| EP | 1927626 | 6/2008 |
| EP | 1927627 | 6/2008 |
| EP | 1950233 | 7/2008 |
| EP | 1961777 | 8/2008 |
| FR | 2532649 | 3/1997 |
| GB | 2345489 | 7/2000 |
| WO | WO 93/03093 | 2/1993 |
| WO | WO 94/25497 | 11/1994 |
| WO | WO 96/04322 | 2/1996 |
| WO | WO 96/04323 | 2/1996 |
| WO | WO 99/07745 | 2/1999 |
| WO | WO 99/12982 | 3/1999 |
| WO | WO 99/35174 | 7/1999 |
| WO | WO 99/48934 | 9/1999 |
| WO | WO 00/44792 | 8/2000 |
| WO | WO 00/68274 | 11/2000 |
| WO | WO 02/46246 A2 | 6/2002 |
| WO | WO 03/011920 | 2/2003 |
| WO | WO 03/014169 | 2/2003 |
| WO | WO 03/042253 | 5/2003 |
| WO | WO 2007/003322 | 1/2007 |
| WO | WO 2007/104513 | 9/2007 |
| WO | WO 2008/089979 | 7/2008 |

OTHER PUBLICATIONS

Chiu-Hsun Lin; *Control of polymer particle size by supported metallocene catalysts* Catalysis Letters 68 (2000) 63-65.

EP1931714 Notice of Opposition (Nov. 9, 2009).

Fukuzawa Tsuyoshi et al.; *Growth of Particles in Cluster-Size Range in Low Pressure and Low Power $SiH_4$ rf Discharges* J. of Applied Physics vol. 86 No. 7 (1999) pp. 3543- 3549.

R. A. Hutchinson et al.; *Polymerization of Olefins through Heterogeneous Catalysis X: Modeling of Particle Growth and Morphology;* Journal of Applied Polymer Science vol. 44 1389-1414 (1992).

S. Floyd et al.; *Polymerization of Olefins through Heterogeneous Catalysis. III. Polymer Particle Modelling with an Analysis of Intraparticle Heat and Mass Transfer Effects;* Journal of Applied Polymer Science vol. 32 2935-2960 (1986).

S. Floyd et al.; *Polymerization of Olefins Through Heterogeneous Catalysis IV. Modeling of Heat and Mass Transfer Resistance in the Polymer Particle Boundary Layer;* Journal of Applied Polymer Science vol. 31 2231-2265 (1986).

Webb Paul A. *Volume and Density Determinations for Particle Technologists* Feb. 2001 Micromeritics Instrument Corporation publication.

\* cited by examiner

BULK DENSITY PROMOTING AGENTS IN A GAS-PHASE POLYMERIZATION PROCESS TO ACHIEVE A BULK PARTICLE DENSITY

CROSS-REFERENCE TO RELATED APPLICATION

This is a continuation-in-part of co-pending International Patent Application Ser. No. PCT/US2007/009144, with an international filing date of Apr. 12, 2007 published in English under PCT Article 21(2) Nov. 22, 2007, which is hereby incorporated by reference in its entirety.

FIELD OF THE INVENTION

The invention relates generally to a process for polyolefin manufacturing in gas-phase fluidized bed polymerization reactors utilizing a C6 or higher hydrocarbon diluent to improve polymer bulk density.

BACKGROUND

Gas phase fluidized bed reactors for the production of olefin polymers are well known in the art. Gas phase processes successfully allow for production of a vast array of polymers, while reducing energy requirements and capital investments required to run the gas phase processes as compared to other polymerization processes. Gas phase polymerization processes typically run a continuous cycle of a gaseous stream through the reactor. Generally, the stream contains one or more monomers. The stream is continuously passed through the fluidized bed under reactive conditions in the presence of a catalyst. The stream is withdrawn from the fluidized bed and recycled back into the reactor. Simultaneously, polymer products are withdrawn from the reactor and additional monomer is added to the stream to replace the polymerized monomer. In gas phase fluidized bed polymerizations, the polymer products are discharged from the reactor in a granular form.

By continuously flowing the stream of monomers through the reactor under reactive conditions, thereby exposing the monomers to catalysts present in the reactor, polymerization of the monomers occurs. The polymer products result from the formation of "micro-particle clusters" on the activation sites of the catalyst particles. As the micro-particle clusters develop, spaces are often present between the clusters. These spaces lead to voids of space in the polymer granular particles as the micro-particle clusters grow and develop into granular polymer "macro-particles." For example, in polyethylene particles made in a gas phase reactor, there may often exist a void of 10 to 25 percent by volume.

The size of voids present in a granular polymer particle may partially depend upon the activity of the catalysts in the fluidized bed reactor. A sudden halt of catalytic activity may contribute to the existence of voids. Such a halt may result for example from a rise in temperature such that the temperature exceeds the catalyst's threshold temperature for activity. Such heat may be generated from the polymerization process itself. Inadequate removal of this heat generated from the polymerization process may further result in temperature gradients within the growing polymer particle. See S. Floyd, et al., "Polymerization of Olefins through Heterogeneous Catalysis. III. Polymer Particle Modelling with an Analysis of Intraparticle Heat and Mass Transfer Effects," J. App. Polymer Sci, vol.32, 2935-60 (1986). W. H. Ray, et al., "Polymerizaton of Olefins through Heterogeneous Catalysis X: Modeling of Particle Growth and Morphology," J. App. Polymer Sci., vol. 44, 1389-1414 (1992) also teaches that greater heat and mass transfer resistance may lead to higher internal voids within granular polymer particles. Significant polymer particle overheating may also cause particle sticking and agglomeration problems in gas phase polymerizations.

The existence of the voids in the polymer often necessitates that the polymer granules undergo a high-energy consumption pelleting procedure, whereby the granular particles are melted to produce pellets having a density similar to that of the polymer density and a desired size. When there is no void in polymer pellets, the density of the pellets will be identical to the polymer density. Such pellets are often desired by customers as they allow for efficiency in transportation and handling. The pelleting procedure, however, contributes significantly to manufacturing and operating costs.

When the granular particle density of the polymer granules discharged from the reactor is relatively similar to the polymer density, the pelleting procedure can be eliminated. Granular particles that are discharged with the proper particle size and/or particle size distribution can be delivered directly to the customers after purging out residual hydrocarbons.

Minimization of void space and thus maximization of bulk density or granular particle density may allow for an increase in reactor inventory, in which case a given reactor would be equivalent to a larger reactor having a higher production capacity, with fewer costs and time associated with a pelleting procedure that can either be improved or eliminated. Accordingly, there exists a need for a polymerization process by which polymer particles having a less void and a greater granular particle density may be achieved.

SUMMARY OF INVENTION

In one aspect, the present invention relates to a gas phase polymerization process comprising the steps of passing a recycle stream through a fluidized bed in a gas phase fluidized bed reactor in the presence of a bulk density promoting agent, wherein the bulk density promoting agent is comprised of a saturated hydrocarbon and/or a non-polymerizable unsaturated hydrocarbon having 6 or more carbon atoms; polymerizing at least one alpha-olefin monomer in the presence of a catalyst to produce an alpha-olefin polymer; and controlling an amount of the bulk density promoting agent in the reactor such that a bulk density of the alpha-olefin polymer discharged from the reactor is greater than or equal to about 480 kg/m$^3$.

DETAILED DESCRIPTION

In one aspect, embodiments of the invention relate to processes for producing a polymer. In particular, embodiments of the invention relate to processes for controlling the bulk density of polymer particles produced in a gas phase polymerization.

Figure 1:
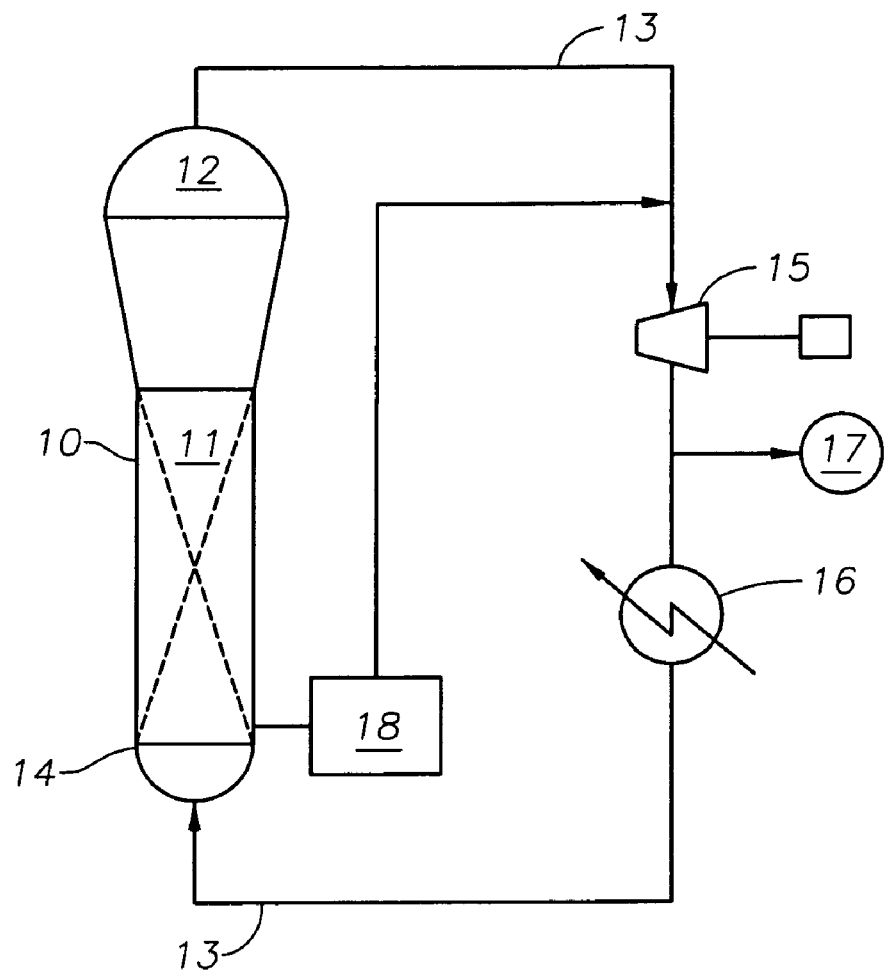
FIG. 1 is a schematic illustration of a fluidized bed reactor.

Referring to FIG. 1, a fluidized bed reactor, which may be used in gas phase polymerizations, is shown. The fluidized bed reactor 10 includes a reaction zone 11 and a velocity reduction zone 12. The reaction zone 11 includes a fluidized bed comprising growing polymer particles, formed polymer particles, and small amounts of catalyst, fluidized by the continuous flow of a recycle stream or fluidizing medium 13. The recycle stream 13 of gaseous components may include both make-up feed and fluid recycled through the fluidized bed reactor 10. The recycle stream enters the fluidized bed reactor 10 through a distribution plate 14 at the bottom of the reaction zone 11. The distribution plate 14 aids in uniform distribution of the recycle stream 13 and also support the solid particles of the fluidized bed. Fluidization of the fluidized bed in the reaction zone 11 results from the high rate at which the recycle stream 13 flows into and through the fluidized bed reactor 10, typically on the order of 50 times the rate of feed of any make-up feed. The high rate of the recycle stream 13 allows for the superficial gas velocity necessary to suspend and mix the fluidized bed in the reaction zone 11 in a fluidized state.

The recycle stream 13 passes upward through the reaction zone 11, absorbing heat generated by the polymerization process. The portion of the recycle stream 13 that does not react in the reaction zone 11 will leave the reaction zone 11 and pass through the velocity reduction zone 12. In the velocity reduction zone 12, most polymer particles entrained within the recycle stream 13 will drop back down into the reaction zone 11, thereby reducing the amount of polymer particles that may exit the fluidized bed reactor 10 with the recycle stream 13. Once the recycle stream 13 flows out of the velocity reduction zone 12, it is compressed by a compressor 15. A gas analyzer 17 will analyze samples from the recycle stream 13, prior to its return to the fluidized bed reactor 10, to monitor the composition of the recycle stream and determine any amount of make-up feed necessary to maintain a predetermined composition. The gas analyzer 17 typically analyzes samples prior to the recycle stream 13 passing through a heat exchanger 16. After compression, the recycle stream 13 flows through the heat exchanger 16 to remove the heat generated by the polymerization process and cool the recycle stream 13.

Figure 2:
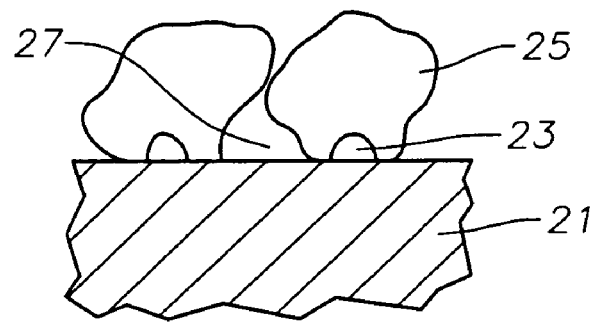
FIG. 2 illustrates a mechanism of polymer particle growth in polymerization reactors.

When a continuous flow of olefin monomers in the recycle stream 13 is exposed to catalysts present in the fluidized bed reactor 10, polymerization of the monomers occurs. A mechanism of polymer particle growth in a fluidized bed reactor 10 may be shown in FIG. 2. When a solid catalyst 21 is fed into the reactor, the activation sites 23 on the catalyst particle 21 trigger the polymerization reaction and proliferation of the monomers into polymer micro-particle cluster 25. Each catalyst particle 21 may allow for many such polymer micro-particle clusters 25 to grow and develop on the catalyst 21 such that the catalyst may eventually fragment into small particles surrounded by growing granular polymer macro-particles.

As the polymer micro-particle clusters 25 grow, the spaces 27 among those polymer micro-particle clusters 25 develop into pockets of voids within a larger polymer macro-particle. Polymer macro-particles having a larger volume of voids results in a lower bulk density. The granular particle density, also referred to as envelope density, takes into account the entire volume occupied by an object, including the object's pores, cavities, or in the present case, voids.

If growth of polymer micro-particle clusters 25 stops quickly, the spaces 27 among neighboring polymer micro-particle clusters 25 or voids in the polymer macro-particle are less likely to be filled by polymer. Therefore, a relatively large volume of such voids will remain within the granular polymer particle, resulting in a less dense polymer particle. The amount of the polymer particles occupied by voids may range from 5% to 40% of the polymer particle volume. More specifically, the void volume may account for 10% to 25% of the polymer particles. This set of circumstances may also contribute to a lower bulk density of the polymer product produced, which is a function of the polymer density and also the packing and lack of inter-particle voids of a polymer product.

Referring back to FIG. 1, following the polymerization and formation of polymer particles, the polymerization product may be removed from the fluidized bed reactor at a discharge point 18. Although not shown, it may be desirable to separate any fluid from the product and return the fluid to the fluidized bed reaction 10. Also not shown, the polymer product may be subsequently analyzed for desired properties such as particle size, particle size distribution, melt index, and density and products having such properties may be isolated.

According to one embodiment of the present invention, a gaseous stream comprising at least one monomer may be continuously passed through a fluidized bed reactor in the presence of a catalyst and one or more bulk density promoting agent(s), each comprising 6 or more carbon atoms, (BDPA) to form a polymeric product. The BDPA is present in the reactor at a concentration sufficient to produce a final polymer product that when discharged from the reactor has a bulk density of greater than or equal to about 480 kg/m$^3$ (30 lbs/ft$^3$), preferably greater than or equal to about 500 kg/m$^3$ (31 lbs/ft$^3$), preferably greater than or equal to about 510 kg/m$^3$ (32 lbs/ft$^3$.) The polymeric product having an increased bulk density and a recycle stream comprised of unreacted monomers may be separately withdrawn from the fluidized bed reactor. The withdrawn recycle stream may be cooled and reintroduced into the fluidized bed reactor with sufficient additional monomer and/or BDPA to replace the monomer and/or BDPA which was withdrawn with the polymeric product. A portion of the reactor gas is also withdrawn with the polymeric product through discharge point 18. At least a portion of this gas is preferably recovered and returned to the reactor.

This increase in bulk density may present itself in the form of an increase in the reactor bed weight (at a fixed reactor bed volume), relative to a polymerization conducted in essentially the same way under the same set of conditions except for the inventive bulk density promoting agent comprising 6 or more carbon atoms. For example, the bed weight of a polymerization reactor utilizing the inventive bulk density promoting agent comprising 6 or more carbon atoms will be increased relative to the bed weight of a comparative polymerization reactor wherein the bulk density promoting agent consists essentially of agents having 5 carbons or less, in other words, wherein a BDPA having 6 or more carbon atoms is not present in substantial quantity.

According to yet another embodiment of the present invention, a gaseous stream comprising monomers may be continuously passed through the fluidized bed reactor in the presence of a catalyst. Polymer particles may be formed from the monomers on the catalyst. At least one of the polymer particles or the catalyst may be cooled by the stream.

According to some embodiments of the present invention, at least a portion of the recycle stream is condensed prior to reintroducing the recycle stream into the fluidized bed reactor. In some embodiments, the at least one bulk density promoting agent induces condensing of the recycle stream. In another embodiments, an agent other than the at least one bulk density promoting agent induces condensing of the recycle stream. According to other embodiments, the dew point of the recycle stream is increased.

When other operating conditions (such as the catalyst and the polymer) are fixed, the temperature of the polymer particle is directly related to the particle-to-fluid (most likely particle to gas) heat-transfer coefficient, h. This heat-transfer coefficient is in turn related to the operating parameters of a fluidized bed in the following form:

$$\frac{d_p h}{k_g} = 2 + (0.6 \sim 1.8)\left(\frac{d_p U_0 \rho_g}{\mu}\right)^{1/2}\left(\frac{C_{pg}\mu}{k_g}\right)^{1/3} \quad (1)$$

where $C_{pg}$ is specific heat of fluid (most likely gas), $d_p$ is average particle size in the bed, $k_g$ is thermal conductivity of the fluid (most likely gas), $U_0$ is superficial fluid (most likely gas) velocity in the bed, $\rho_g$ is density of fluid (most likely gas), and $\mu$ is fluid (most likely gas) viscosity.

Under the operating conditions of a gas-phase polymerization reactor, the value of $(d_p h/k_g)$ is significantly larger than 2. Therefore, Eq. (1) can be approximated to:

$$\frac{d_p h}{k_g} = (0.6 \sim 1.8)\left(\frac{d_p U_0 \rho_g}{\mu}\right)^{1/2}\left(\frac{C_{pg}\mu}{k_g}\right)^{1/3} \quad (2)$$

Taking into account that the gas velocity and average particle size in the bed are usually fixed values, the following relationship can be derived from Eq. (2):

$$h \propto k_g^{2/3} \rho_g^{1/2} C_{pg}^{1/3} \mu^{-1/6} \quad (3)$$

It can be shown from Eq. (3) that the parameters that affect the particle-to-gas heat-transfer coefficient are, in the order of their influence level, thermal conductivity of the gas, gas density, specific heat of the gas, and gas viscosity. A "heat-transfer promoting index," $I_H$, can be defined as:

$$I_H = k_g^{2/3} \rho_g^{1/2} C_{pg}^{1/3} \mu^{-1/6} \quad (4)$$

This index may be applied to individual components in the fluidizing gas or to the overall gas composition in the gas-phase polymerization reactor. The unit of $I_H$ is $J \cdot m^{-2} \cdot K^{-1} \cdot sec^{-0.5}$.

Because catalysts' activation sites are not always on the outer surface of the catalyst, polymer micro-particle clusters may grow within the particle, with polymer macro-particles surrounding and eventually enveloping the catalyst particles. Therefore, the delivery and withdrawal of a species having a relatively high thermal conductivity or a relatively high $I_H$ into and out of the polymer particles may become a mechanism of cooling the polymer micro-particle clusters. In an embodiment, the BDPA provides this function. Since even if a gas composition has a relatively high $I_H$, but insufficient amounts of the high thermal conductivity agents are delivered into the polymer particles, the agents will not sufficiently cool the polymer and/or catalyst to prevent catalytic shut-down. Thus, large volumes of voids may be present, and the granular particle density of the polymer particle would not be significantly increased. Hence, a gas composition having the property of a high $I_H$ does not necessitate a polymer having a high granular particle density. Accordingly, the BDPA is preferably present within the reactor at a concentration sufficient to produce a polymer product having an increased bulk density.

The capability of the BDPA having a high thermal conductivity agent (or a high $I_H$ agent) to cool the internal polymer micro-particle clusters may also depend on the availability and speed of that agent to permeate within and withdraw from the particle. A BDPA having a high solubility within the polymer particles indicates that a relatively large amount of that component can permeate the polymer particle. A BDPA component having a high diffusivity in the polymer particle indicates that it can quickly move in and out of the polymer particle. Thus, a BDPA having relatively high diffusivity and relatively high solubility may contribute to the agent's ability to cool the polymer particle and achieve a relatively high particle density.

The absolute amount and efficiency of a component available for the local intra-particle cooling is also determined by the driving force, the difference in concentration of that component within and outside the polymer particle. Therefore, a high $I_H$ agent having a high concentration in the fluidizing gas may have a more significant effect in cooling the polymer particles and increasing the particle density.

Because the solubility of the bulk density promoting agent may depend upon operating conditions such as temperature, etc. and the type of polymer being formed, the normal boiling point (i.e., the boiling temperature at ambient pressure) of the agent may be employed to roughly judge the relative differences in the solubilities of different components.

In addition, some components may induce a "swelling effect." A swelling effect may be observed when the adsorption of those components by the polymer particles causes the polymer particles to swell. In turn, the pathway for diffusion into the polymer particles may widen, assisting the move of those components into and out of the particles, and further cooling the polymer particles. It may be observed that agents with strong swelling effects have a relatively high solubility in the polymer.

Considering the many variables that may have a role in particle cooling and polymer micro-particle cluster growth, a proper selection of the gas composition, with respect to $I_H$, diffusivity in polymer, solubility in polymer, swelling effect, concentration, etc., may increase or even maximize a polymer's granular particle density and/or a polymer's bulk density.

During typical operations of a fluidized bed reactor, the ability to change the gas composition of the recycle stream flowing through the reactor is dependent upon such factors as those including catalyst type, product specification, reactor pressure rating, and equipment specification. Therefore, it is often difficult to significantly manipulate the gas composition to maximize $I_H$ for the purpose of particle density increase. However, by adding one or more than one inert BDPAs (bulk density promoting agents) into the reactor, e.g., into the recycle stream, without significantly changing other operating conditions, the granular particle density and/or the bulk density may be increased, which may include reducing or eliminating internal voids.

According to some embodiments of the present invention, at least a significant fraction of BDPA exists in the gas-phase in a significant portion of the reactor, because in a gas-phase, BDPA may more effectively reduce void volume. Typically, the distribution and dispersion of liquid within most of the dense fluidized-bed is less uniform (e.g., in the form of droplets) than that of a gas, making a compound in a liquid phase less available for cooling individual particles. Thus, according to some embodiments of the present invention, a limit to a selected bulk density promoting agent's normal boiling point may be desirable.

In one embodiment of the present invention, the at least one bulk density promoting agent may include at least one organic compound. The at least one organic compound may include at least one hydrocarbon comprised of 6 or more hydrocarbons, and/or at least one fluorine-containing compound.

In another embodiment of the present invention, the at least one bulk density promoting agent may include at least one compound selected from the group consisting of $C_6$-$C_{20}$ alkanes, $C_6$-$C_{20}$ cyclo-alkanes comprising 5-18 member rings, internal unsaturated hydrocarbons, aromatic hydrocarbons, hydroflourocarbons, chlorohydrocarbons, and mixtures thereof. In yet another embodiment, the at least one bulk density promoting agent is essentially free from saturated hydrocarbons having five or fewer carbon atoms.

As used herein, a relative $I_H$ value is calculated for pure or 100% BDPA at the reactor temperature and pressure (the pure BDPA may be in a liquid state, although it often appears in a gas state after flashed in the reactor). It would be obvious to one of ordinary skill in the art that a relative $I_H$ value calculated for the BDPA when it is in a gas state that would differ from the $I_H$ value calculated for a BDPA in a liquid state. Thus, the exact method of determining the $I_H$ for the BDPA is not intended to be a limitation on the scope of the present invention.

According to some embodiments of the present invention, the at least one bulk density promoting agent has a relative $I_H$ of greater than about 250, calculated at reactor temperature and pressure (e.g., 250° C. and 2.16×10$^6$ Pa). Relative $I_H$ values calculated at a sample reactor temperature and pressure for a non-exhaustive list of representative compounds that may be included in the at least one bulk density promoting agent are shown below in Table 1.

TABLE 1

| Compound | $I_H$ | Temperature (° C.) | Pressure (Pa) |
|---|---|---|---|
| 2,2-Dimethylbutane | 272.7 | 87.5 | $2.16 \times 10^6$ |
| 2,3-Dimethylbutane | 283.6 | 87.5 | $2.16 \times 10^6$ |
| 2-methylpentane | 290.2 | 87.5 | $2.16 \times 10^6$ |
| 3-methylpentane | 292.5 | 87.5 | $2.16 \times 10^6$ |
| n-Hexane | 300.9 | 87.5 | $2.16 \times 10^6$ |
| Methylcyclopentane | 299.7 | 87.5 | $2.16 \times 10^6$ |

According to other embodiments of the present invention, the at least one bulk density promoting agent has a normal boiling point in the range of from about 25° C. to about 150° C.

According to other embodiments of the present invention, the at least one bulk density promoting agent comprises at least 0.5 mol % of the recycle stream.

According to other embodiments of the present invention, the at least one bulk density promoting agent comprises at least 1.5 mol % of the recycle stream.

In other embodiments of the present invention, the concentration of the bulk density promoting agent in the reactor may range from about 0.5 to about 50 vol. %. Within this range, the concentration of the bulk density promoting agent in the reactor may be greater than or equal to about 1% (by volume), preferably greater than or equal to about 2%, preferably greater than or equal to about 3%, preferably greater than or equal to about 4%, preferably greater than or equal to about 5%, preferably greater than or equal to about 6%, preferably greater than or equal to about 7%, preferably greater than or equal to about 8%, preferably greater than or equal to about 9%, preferably greater than or equal to about 10%, preferably greater than or equal to about 15%, preferably greater than or equal to about 20%, preferably greater than or equal to about 25%, preferably greater than or equal to about 30%, preferably greater than or equal to about 35%, preferably greater than or equal to about 40%, based on the total amount of material present in the reactor. Likewise, the concentration of the bulk density promoting agent may be less than or equal to about 45%, preferably less than or equal to about 40%, preferably less than or equal to about 30%, preferably less than or equal to about 20%, preferably less than or equal to about 10%, preferably less than or equal to about 9%, preferably less than or equal to about 8%, preferably less than or equal to about 7%, preferably less than or equal to about 6%, preferably less than or equal to about 5%, preferably less than or equal to about 4%, preferably less than or equal to about 3%, preferably less than or equal to about 2%, based on the total amount of material in the reactor.

Figure 6:
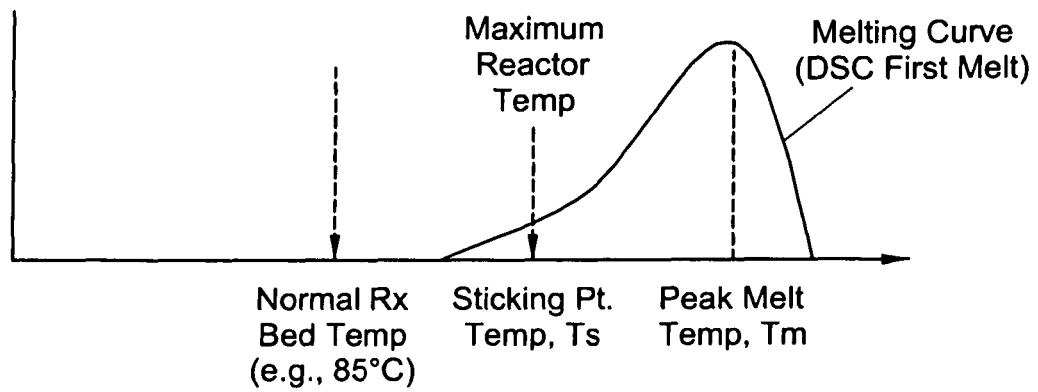
FIG. 6 is a graphical illustration of the Sticking Point Temperature.

However, importantly, the concentration of the BDPA is preferably below the point in the reactor for a given set of conditions in which the polymer produced becomes sticky by reaching the "sticking point temperature" such that unfavorable operational conditions may exist. As shown in FIG. 6, the polymer becomes sticky when the bed temperature exceeds the sticking point temperature, which may be slightly in excess of the minimum melting point of the polymer produced. This sticky temperature may be affected by the concentration of the BDPA, and thus must be determined under a set of conditions, as described in U.S. Pat. No. 7,300,987, and in PCT/US2008/000732 filed Jan. 18, 2008, which claims benefit from U.S. Application No. 60/901,906 filed Feb. 16, 2007, the disclosures of which are incorporated by reference in their entirety for disclosure directed to the "sticky temperature."

Applicants also unexpectedly discovered that utilization of the instant BDPA results in a decrease in "fines" production. As known in the art, it is desirable to prevent production of small polymer particles known as "polymer fines". Polymer fines are undesirable in gas phase fluidized bed polymerization systems, as they tend to segregate to the top of the fluidizing bed, causing problems with bed level control. They are also preferentially entrained into the cycle gas leading to system plugging in heat exchangers and compressors, buildup in the bottom head of the reaction system and formation of gels due to continued polymerization at lower temperatures than the bulk of the polymer product. All of the above lead to poor commercial operation, reduced polymerization efficiency, and generally impaired operation. High levels of fines can also cause problems in downstream handling of the polymer once it exits the polymerization system. Fines can cause poor flow in purge bins, plug filters in bins and present safety problems. The above problems make elimination or reduction of polymer fines important to commercial operation of a gas-phase polymerization process. The term "polymer fines" as used herein means polymer particles of less than 125 micrometers in particle size.

In an embodiment, the utilization of the instant BDPA results in less than 10 wt % polymer fines, based on the total amount of polymer produced. Preferably, the use of the instant BDPA results in less than 9 wt %, preferably less than 8 wt %, preferably less than 7 wt %, preferably less than 6 wt %, preferably less than 5 wt %, preferably less than 4 wt %, preferably less than 3 wt %, preferably less than 2 wt %, preferably less than 1 wt %, preferably less than 0.5 wt %, fines, based on the total amount of polymer produced.

In addition, the use of the instant BDPA may also result in an increase in the number of 10 mesh or greater particles produced in the reactor. Preferably, the use of the instant BDPA results in formation of >10 Mesh particles of greater than 1 wt %, preferably greater than 2 wt %, preferably greater than 3 wt %, preferably greater than 4 wt %, preferably greater than 5 wt %, preferably greater than 6 wt %, preferably greater than 7 wt %, preferably greater than 10 wt %, based on the total amount of polymer produced.

As noted above, gas phase polymerization reactions may be carried out in any exothermic polymerization process in a gas phase fluidized bed. Preferably, the present invention is employed in fluidized bed polymerizations (that may be mechanically stirred and/or gas fluidized), with those utilizing a gas phase being most preferred. The present invention is not limited to any specific type of fluidized or gas phase polymerization reaction and can be carried out in a single reactor or multiple reactors such as two or more reactors in series. In addition to well-known conventional gas phase polymerization processes, it is within the scope of the present invention that "condensing mode", including the "induced condensing mode" and "liquid monomer" operation of a gas phase polymerization may be used.

Embodiments of the present invention may employ a condensing mode polymerization, such as those disclosed in U.S. Pat. Nos. 4,543,399; 4,588,790; 4,994,534; 5,352,749; and 5,462,999. Condensing mode processes may be used to achieve higher cooling capacities and, hence, higher reactor productivity. Referring back to FIG. 1, in these polymerizations, the recycle stream 13, or a at least a portion thereof, may be cooled to a temperature below the dew point in a fluidized bed polymerization process, resulting in condensing all or at least a portion of the recycle stream 13. The recycle stream 13 may then be returned to the reactor 10. The dew point of the recycle stream 13 can be increased by increasing the operating pressure of the reaction/recycle system and/or increasing the percentage of condensable fluids and decreasing the percentage of non-condensable gases in the recycle stream 13. Condensable fluids added may be inert to the catalyst, reactants, and the polymer product produced. Further, condensable fluids may include saturated or unsaturated hydrocarbons and/or monomers and comonomers of the system. The condensing fluid can be introduced into the recycle stream 13 at any point in the system.

In addition to condensable fluids of the polymerization process itself, other condensable fluids inert to the polymerization may be introduced to induce a condensing mode operation, such as by the processes described in U.S. Pat. No. 5,436,304. Examples of suitable condensable fluids may be selected from liquid saturated hydrocarbons containing 5 to 8 carbon atoms such as isopentane, n-hexane, isohexane, and other saturated C6 hydrocarbons, n-heptane, n-octane and other saturated C7 and C8 hydrocarbons, and mixtures thereof. Condensable fluids may also include polymerizable condensable comonomers such as olefins, alpha-olefins, diolefins, diolefins containing at least one alpha olefin, and mixtures thereof. In condensing mode, it is desirable that the liquid entering the fluidized bed is dispersed and vaporized quickly. In one embodiment of the present invention, the at least one bulk density promoting agent may operate to induce a condensing mode operation. In another embodiment of the present invention, condensing mode operation may be induced by an agent other than the at least one bulk density promoting agent.

Other embodiments of the preset invention may also use a liquid monomer polymerization mode such as those disclosed in U.S. Pat. No. 5,453,471; U.S. Ser. No. 08/510,375; PCT 95/09826 (US) and PCT 95/09827 (US). When operating in the liquid monomer mode, liquid can be present throughout the entire polymer bed provided that the liquid monomer present in the bed is adsorbed on or in solid particulate matter present in the bed, such as polymer being produced or inert particulate material (e.g., carbon black, silica, clay, talc, and mixtures thereof), so long as there is no substantial amount of free liquid monomer present. Operating in a liquid monomer mode may also make it possible to produce polymers in a gas phase reactor using monomers having condensation temperatures much higher than the temperatures at which conventional polyolefins are produced.

In general, a liquid monomer mode process is conducted in a stirred bed or gas fluidized bed reaction vessel having a polymerization zone containing a bed of growing polymer particles. The process may include continuously introducing a stream of one or more monomers and optionally one or more inert gases or liquids into the polymerization zone, continuously or intermittently introducing a polymerization catalyst into the polymerization zone, continuously or intermittently withdrawing polymer product from the polymerization zone, continuously withdrawing unreacted gases from the zone; and compressing and cooling the gases while maintaining the temperature within the zone below the dew point of at least one monomer present in the zone. If there is only one monomer present in the gas-liquid stream, at least one inert gas is preferably present. Typically, the temperature within the zone and the velocity of gases passing through the zone are such that essentially no liquid is present in the polymerization zone that is not adsorbed on or in solid particulate matter.

Typically, the fluidized bed polymerization process is conducted at a pressure ranging from about 10 to 1000 psi, preferably about 200 to about 600 psi and a temperature ranging from about 10° C. to about 150° C., preferably about 40° C. to about 125° C. During the polymerization process the superficial gas velocity ranges from about 0.7 to 3.5 feet/second, and preferably about 1.0 to 2.7 feet/second.

Illustrative of the polymers which may be produced in accordance with some embodiments of the present invention include the following: homopolymers and copolymers of C2-C18 alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; polychloroprene; norbornene homopolymers and copolymers with one or more C2-C18 alpha olefin; terpolymers of one or more C2-C18 alpha olefins with a diene and the like.

Monomers that may be used in various embodiments of the present invention include one or more of the following: C2-C18 alpha olefins such as ethylene, propylene, and optionally at least one diene such as those taught in U.S. Pat. No. 5,317,036 and including for example, hexadiene, dicyclopentadiene, octadiene including methyloctadiene (e.g., 1-methyl-1,6-octadiene and 7-methyl-1,6-octadiene), norbornadiene, and ethylidene norbornene; readily condensable monomers such as those taught in U.S. Pat. No. 5,453,471 including isoprene, styrene, butadiene, isobutylene, chloroprene, acrylonitrile, cyclic olefins such as norbornenes, and the like.

Any type of polymerization catalyst may be used in the polymerization process of the present invention. For example, the range of catalysts that may be used includes a single catalyst or a mixture of catalysts; a soluble or insoluble, supported or unsupported catalyst; and a prepolymer, spray dried with or without a filler, a liquid, or a solution, slurry/suspension or dispersion. These catalysts are used with cocatalysts and promoters well known in the art. For example, these may include alkylaluminums, alkylaluminum halides, alkylaluminum hydrides, as well as aluminoxanes.

For illustrative purposes only, examples of suitable catalysts include Ziegler-Natta catalysts, including titanium based catalysts such as those described in U.S. Pat. Nos. 4,376,062 and 4,379,758. Ziegler-Natta catalysts are well known in the art and typically are magnesium/titanium/electron donor complexes used in conjunction with an organoaluminum cocatalyst.

Also suitable are chromium-based catalysts such as those described in U.S. Pat. Nos. 3,709,853, 3,709,954, and 4,077,904; vanadium based catalysts such as vanadium oxychloride and vanadium acetylacetonate, such those as described in U.S. Pat. No. 5,317,036; metallocene catalysts and other single-site or single-site-like catalysts such as those taught in U.S. Pat. Nos. 4,530,914, 4,665,047, 4,752,597, 5,218,071, 5,272,236, 5,278,272, 5,317,036, and 5,527,752; cationic forms of metal halides, such as aluminum trihalides, anionic initiators such as butyl lithiums; cobalt catalysts and mixtures thereof such as those described in U.S. Pat. Nos. 4,472,559 and 4,182,814; and nickel catalysts and mixtures thereof such as those described in U.S. Pat. Nos. 4,155,880 and 4,102,817.

Rare earth metal catalysts, i.e., those containing a metal having an atomic number in the Periodic Table of 57 to 103, are further suitable catalysts, such as compounds of cerium, lanthanum, praseodymium, gadolinium and neodymium. Specifically, carboxylates, alcoholates, acetylacetonates, halides (including ether and alcohol complexes of neodymium bichloride), and allyl derivatives of such metals, e.g., of neodymium may be used. Neodymium compounds, particularly neodymium neodecanoate, octanoate, and versatate, and n-alkyl neodymium are preferable rare earth metal catalysts. Rare earth catalysts may be preferred when to produce polymers polymerized using butadiene, styrene, or isoprene and the like.

According to some embodiments of the present invention, catalysts for the process of the present invention may preferably include rare earth metal catalysts, titanium catalysts, chromium catalysts, nickel catalysts, vanadium catalysts, and metallocene/single-site/single-site-like catalysts.

In a preferred embodiment, the catalyst of the present invention comprises a Group 15 containing metal compound.

In an embodiment, the Group 15 containing compound generally includes a Group 3 to 14 metal atom, preferably a Group 3 to 7, more preferably a Group 4 to 6, and even more preferably a Group 4 metal atom, bound to at least one leaving group and also bound to at least two Group 15 atoms, at least one of which is also bound to a Group 15 or 16 atom through another group.

In one preferred embodiment, at least one of the Group 15 atoms is also bound to a Group 15 or 16 atom through another group which may be a C1 to C20 hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

In a preferred embodiment, the Group 15 containing metal compound of the present invention may be represented by the formulae

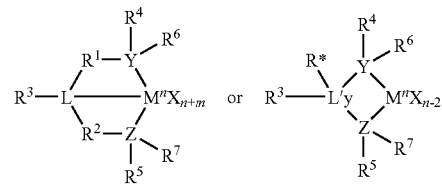

wherein M is a Group 4, 5 or 6 metal;

each X is independently a leaving group;

y is 0 or 1;

n is the oxidation state of M;

m is the formal charge of the ligand comprising the YZL or YZL' groups;

L is Nitrogen;

L' is a Group 15 or 16 element or Group 14 containing group;

Y is Nitrogen;

Z is Nitrogen;

$R^1$ and $R^2$ are independently a $C_1$ to $C_{20}$ hydrocarbon group, a heteroatom containing group having up to twenty carbon atoms, silicon, germanium, tin, lead, or phosphorus; wherein $R^1$ and $R^2$ may be interconnected to each other;

$R^3$ is absent or a hydrocarbon group, hydrogen, a halogen, a heteroatom containing group;

$R^4$ and $R^5$ are independently an alkyl group, an aryl group, substituted aryl group, a cyclic alkyl group, a substituted cyclic alkyl group, a cyclic arylalkyl group, a substituted cyclic arylalkyl group or a multiple ring system;

wherein $R^4$ and $R^5$ may be interconnected to each other;

$R^6$ and $R^7$ are independently absent, hydrogen, an alkyl group, halogen, heteroatom or a hydrocarbyl group;

R* is absent, hydrogen, a Group 14 atom containing group, a halogen, or a heteroatom containing group By "formal charge of the YZL or YZL' ligand", it is meant the charge of the entire ligand absent the metal and the leaving groups X.

By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

An alkyl group may be a linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In a preferred embodiment $R^4$ and $R^5$ are independently a group represented by the following formula:

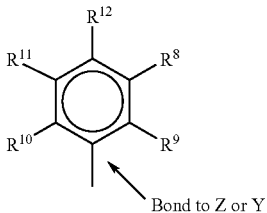

wherein $R^8$ to $R^{12}$ are each independently hydrogen, a $C_1$ to $C_{40}$ alkyl group, a halide, a heteroatom, or a heteroatom containing group containing up to 40 carbon atoms, wherein any two R groups may form a cyclic group and/or a heterocyclic group, and wherein the cyclic groups may be aromatic.

In a preferred embodiment, R8 to R12 are independently a methyl, ethyl, propyl or butyl group and X is a substituted aryl group having greater than 10 carbon atoms. In yet another preferred embodiment, $R^8$ to $R^{12}$ are methyl groups, and X is an alkyl substituted with an aryl group. In another embodiment, L, Y, and Z are nitrogen, $R^1$ and $R^2$ are a hydrocarbon radical, $R^3$ is hydrogen, and $R^6$ and $R^7$ are absent. In another embodiment, L and Z are independently nitrogen and $R^6$ and $R^7$ are absent.

In a particularly preferred embodiment the Group 15 containing metal compound comprises a tridentate ligated Group 3 to 7 metal compound and is represented by the formula:

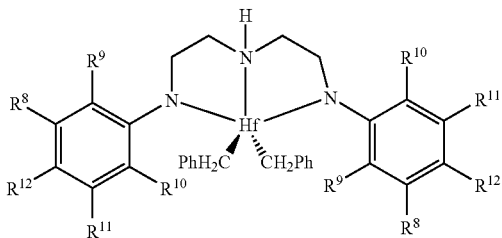

wherein $R^8$ to $R^{12}$ are each independently a methyl, ethyl, propyl, or butyl group.

The Group 15 containing metal compounds of the invention are prepared by methods known in the art, such as those disclosed in EP 0 893 454 A1, U.S. Pat. No. 5,889,128 and the references cited in U.S. Pat. No. 5,889,128 which are all herein incorporated by reference. U.S. application Ser. No. 09/312,878, filed May 17, 1999 pending discloses a gas or slurry phase polymerization process using a supported bisamide catalyst, which is also incorporated herein by reference.

Polymer Product

The polymers produced by the process of the invention are useful in making a wide variety of products and useful in many end-use applications. The polymers produced by the process of the invention include linear low density polyethylenes, elastomers, plastomers, high density polyethylenes, low density polyethylenes, polypropylene, and polypropylene copolymers.

In an embodiment, the polymers produced, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc.

In one embodiment, the polymers produced by the process of the invention typically have a molecular weight distribution, a weight average molecular weight to number average molecular weight ($M_w/M_n$) of greater than 1.5 to about 30, particularly greater than 2 to about 15, more preferably greater than 2 to about 10, even more preferably greater than about 2.2 to less than about 8, and most preferably from 2.5 to 8. The ratio of $M_w/M_n$ is measured by gel permeation chromatography techniques well known in the art.

In yet another embodiment, the ethylene-based polymers produced by the process of the invention typically have a narrow or broad composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference. Typically when a bulky ligand metallocene-type polymerization catalyst is utilized in the process of the invention producing an ethylene copolymer, terpolymer and the like, the CDBI's are generally in the range of greater than 50% to 99%, preferably in the range of 55% to 85%, and more preferably 60% to 80%, even more preferably greater than 60%, still even more preferably greater than 65%. Typically when a conventional-type transition metal polymerization catalyst is utilized in the process of the invention producing an ethylene copolymer, terpolymer and the like, the CDBI's are generally less than 50%, more preferably less than 40%, and most preferably less than 30%. Also, whether a bulky ligand metallocene-type polymerization catalyst or a conventional-type transition metal polymerization catalyst is being used and the process is making an ethylene homopolymer, the CDBI is 100%.

Generally, the polymers produced by the process of the invention in one embodiment have a melt index (MI) or ($I_2$) as measured by ASTM-D-1238 (190° C./2.16 kg) in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min. Also, generally, the polymers of the invention in an embodiment have a melt index ratio ($I_{21}/I_2$) [$I_{21}$ is measured by ASTM-D-1238 (190° C./21.6 kg)] of from 10 to less than 25, more preferably from about 15 to less than 25. Further, in another embodiment, the polymers have a melt index ratio ($I_{21}/I_2$) [$I_{2I}$ is measured by ASTM-D-1238 (190° C./21.6 kg)] of from preferably greater than 25, more preferably greater than 30, even more preferably greater that 40, still even more preferably greater than 50 and most preferably greater than 65. In yet another embodiment, the polymers, particularly polymers produced in the process of the invention using a Ziegler-Natta-type polymerization catalyst, have a melt index ratio ($I_{21}/I_2$) [$I_{21}$ is measured by ASTM-D-1238 (190° C./21.6 kg)] in the range of from 15 to 40, preferably in the range of from about 20 to about 35, more preferably in the range of from about 22 to about 30, and most preferably in the range of from 24 to 27.

In yet another embodiment, propylene based polymers are produced in the process of the invention. These polymers include atactic polypropylene, isotactic polypropylene, and syndiotactic polypropylene. Other propylene polymers include propylene random, block, or impact copolymers.

Polymers produced by the process of the invention are useful in such forming operations as film, sheet, and fiber extrusion and co-extrusion as well as blow molding, injection molding, and rotary molding. Films include blown or cast films formed by coextrusion or by lamination, shrink film, cling film, stretch film, sealing films, and oriented films. The films are useful in snack packaging, heavy duty bags, grocery sacks, baked and frozen food packaging, medical packaging, industrial liners, membranes, etc., in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, and the like.

In another embodiment which includes the above disclosed Group 15 containing compound, the Group 15 containing metal compound may produce a high weight average molecular weight $M_w$ polymer (such as for example above 100,000, preferably above 150,000, preferably above 200,000, preferably above 250,000, more preferably above 300,000). The second metal compound, when used alone, produces a low molecular weight polymer (such as for example below 80,000, preferably below 70,000, preferably below 60,000, more preferably below 50,000, more preferably below 40,000, more preferably below 30,000, more preferably below 20,000 and above 5,000, more preferably below 20,000 and above 10,000).

The polyolefins, particularly polyethylenes, produced by the present invention, have a density of 0.89 to 0.97 g/cm$^3$. Preferably, polyethylenes having a density of 0.910 to 0.965 g/cm$^3$, more preferably 0.915 to 0.960 g/cm$^3$, and even more preferably 0.920 to 0.955 g/cm$^3$ can be produced. In some embodiments, a density of 0.915 to 0.940 g/cm$^3$ would be preferred, in other embodiments densities of 0.930 to 0.970 g/cm$^3$ are preferred.

In a preferred embodiment, the polyolefin recovered typically has a melt index $I_2$ (as measured by ASTM D-1238, Condition E at 190° C.) of about 0.01 to 10000 dg/min or less. In a preferred embodiment, the polyolefin is ethylene homopolymer or copolymer. In a preferred embodiment for certain applications, such as films, pipes, molded articles and the like, a melt index of 10 dg/min or less is preferred. For some films and molded articles, a melt index of 1 dg/min or less is preferred. Polyethylene having an $I_2$ between 0.01 and 10 dg/min is preferred.

In a preferred embodiment the polymer produced herein has an $I_{21}$ (as measured by ASTM-D-1238-F, at 190° C.) of 0.1 to 10 dg/min, preferably 0.2 to 7.5 dg/min, preferably 2.0 dg/min or less, preferably 1.5 dg/min or less, preferably 1.2 dg/min or less, more preferably between 0.5 and 1.0 dg/min, more preferably between 0.6 and 0.8 dg/min.

In another embodiment, the polymers of the invention have a melt flow index "MIR" of $I_{21}/I_2$ of 80 or more, preferably 90 or more, preferably 100 or more, preferably 125 or more.

In another embodiment the polymer has an $I_{21}$ (as measured by ASTM 1238, condition F, at 190° C.) (sometimes referred to as Flow Index) of 2.0 dg/min or less, preferably 1.5 dg/min or less, preferably 1.2 dg/min or less, more preferably between 0.5 and 1.0 dg/min, more preferably between 0.6 and 0.8 dg/min and an $I_{21}/I_2$ of 80 or more, preferably 90 or more, preferably 100 or more, preferably 125 or more and has one or more of the following properties in addition:

(a) Mw/Mn of between 15 and 80, preferably between 20 and 60, preferably between 20 and 40. Molecular weight (Mw and Mn) are measured as described below in the examples section;

(b) an Mw of 180,000 or more, preferably 200,000 or more, preferably 250,000 or more, preferably 300,000 or more;

(c) a density (as measured by ASTM 2839) of 0.94 to 0.970 g/cm$^3$; preferably 0.945 to 0.965 g/cm$^3$; preferably 0.950 to 0.960 g/cm$^3$;

(e) a residual metal content of 5.0 ppm transition metal or less, preferably 2.0 ppm transition metal or less, preferably 1.8 ppm transition metal or less, preferably 1.6 ppm transition metal or less, preferably 1.5 ppm transition metal or less, preferably 2.0 ppm or less of Group 4 metal, preferably 1.8 ppm or less of Group 4 metal, preferably 1.6 ppm or less of Group 4 metal, preferably 1.5 ppm or less of Group 4 metal, preferably 2.0 ppm or less zirconium, preferably 1.8 ppm or less zirconium, preferably 1.6 ppm or less zirconium, preferably 1.5 ppm or less zirconium, measured by Inductively Coupled Plasma Optical Emission Spectroscopy (ICPAES) run against commercially available standards, where the sample is heated so as to fully decompose all organics and the solvent comprises nitric acid and, if any support is present, another acid to dissolve any support (such as hydrofluoric acid to dissolve silica supports) is present;

(f) 35 weight percent or more high weight average molecular weight component, as measured by size-exclusion chromatography, preferably 40% or more. In a particularly preferred embodiment the higher molecular weight fraction is present at between 35 and 70 weight %, more preferably between 40 and 60 weight %.

In a preferred embodiment the catalyst composition described above is used to make a polyethylene having a density of between 0.94 and 0.970 g/cm$^3$ (as measured by ASTM D 2839) and an $I_2$ of 0.5 or less g/10 min or less In another embodiment the catalyst composition described above is used to make a polyethylene having an $I_{21}$ of less than 10 and a density of between about 0.940 and 0.950 g/cm$^3$ or an $I_{21}$ of less than 20 and a density of about 0.945 g/cm$^3$ or less.

In another embodiment, the polymer of the invention is made into a pipe by methods known in the art. For pipe applications, the polymers of the invention have an $I_{21}$ of from about 2 to about 10 dg/min and preferably from about 2 to about 8 dg/min. In another embodiment, the pipe of the invention satisfies ISO qualifications.

In another embodiment, the catalyst composition of the present invention is used to make polyethylene pipe able to withstand at least 50 years at an ambient temperature of 20° C., using water as the internal test medium and either water or air as the outside environment (Hydro static (hoop) stress as measured by ISO TR 9080).

In another embodiment, the polymer has a notch tensile test (resistance to slow crack growth) result of greater than 150 hours at 3.0 MPa, preferably greater than 500 hours at 3.0 MPa and more preferably greater than 600 hours at 3.0 mPa. (as measured by ASTM F1473).

In another embodiment, the catalyst composition of the present invention is used to make polyethylene pipe having a predicted S-4 $T_c$ for 110 mm pipe of less than −5° C., preferably of less than −15° C. and more preferably less than −40° C. (ISO DIS 13477/ASTM F1589).

In another embodiment, the polymer has an extrusion rate of greater than about 17 lbs/hour/inch of die circumference and preferably greater than about 20 lbs/hour/inch of die circumference and more preferably greater than about 22 lbs/hour/inch of die circumference The polyolefins of the invention can be made into films, molded articles (including pipes), sheets, wire and cable coating and the like. The films may be formed by any of the conventional techniques known in the art including extrusion, co-extrusion, lamination, blowing and casting. The film may be obtained by the flat film or tubular process which may be followed by orientation in a uniaxial direction or in two mutually perpendicular directions in the plane of the film to the same or different extents. Orientation may be to the same extent in both directions or may be to different extents. Particularly preferred methods to form the polymers into films include extrusion or coextrusion on a blown or cast film line.

In another embodiment, the polymer of the invention is made into a film by methods known in the art. For film application, the polymers of the invention have a $I_{21}$ of from about 2 to about 50 dg/min, preferably from about 2 to about 30 dg/min, even more preferably from about 2 to about 20 dg/min, still more preferably about 5 to about 15 dg/min and yet more preferably from about 5 to about 10 dg/min.

In another embodiment, the polymer has an MD Tear of 0.5 mil (13 micrometers) film of between about 5 g/mil and 25 g/mil preferably, between about 15 g/mil and 25 g/mil, and more preferably between about 20 g/mil and 25 g/mil.

EXAMPLES

All the following examples are related to commercial scale operations conducted in a gas-phase fluidized bed polymerization reactor. The reactor used for these examples has a cylindrical reaction section and an expanded section above the reaction section to reduce the gas velocity. The dense fluidized-bed level was controlled above the distributor plate. The C6 bulk density promoting agent (isohexane) was present in the reactor from about 1 vol % to about 5 vol % during the procedure, determined via partial pressure analysis of the reactor.

In these examples, the catalyst delivery uses hydrocarbon solvent as liquid carrier fluid for the catalyst slurry. Currently, isopentane (IC5) is the solvent carrier of choice and is used in pilot plants and during all of our large commercial size reactor campaigns. The liquid hydrocarbon dilutes the catalyst slurry and helps to continuously flush the material into the reactor. The catalyst slurry along with the hydrocarbon solvent is also assisted by nitrogen gas to form a spray of droplets into the fluidized bed reactor. As the droplets are sprayed into the reactor, the polymerization initiates and simultaneously the liquid hydrocarbon vaporizes into the gas phase. The solvent's heat of vaporization also helps to keep the catalyst particles cooler to help prevent deactivation or polymer fusing.

Higher boiling hydrocarbon, isohexane (IC6), was used as a replacement for isopentane during pilot plant operation with the commercially available BMC200 catalyst. We were surprised to observe that the polymer granule bulk density increased by about 15% (0.44 to 0.51 gm/cc settled bulk density). Also, the polymer formed a larger amount of dense 10 mesh size particles. Higher bulk density polymer increases the reactor efficiency due to providing higher residence time operation in a given reactor and translates to increased catalyst productivity.

Figure 3:
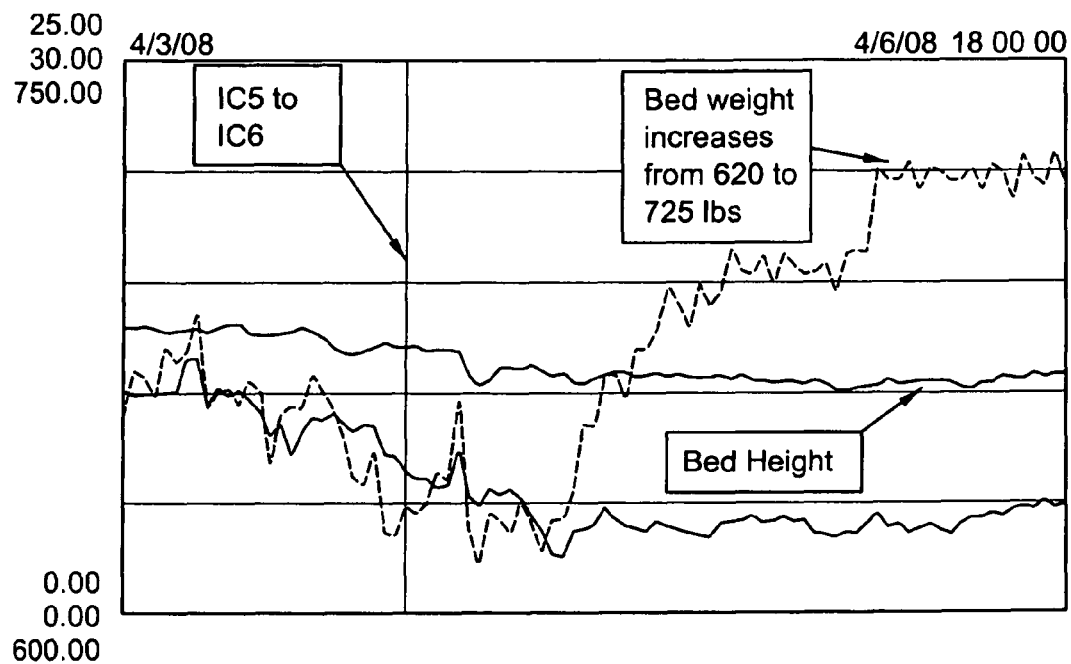
FIG. 3 is a graph illustrating the improvement in reactor bed weight in an embodiment of the instant invention.

As shown in FIG. 3, a comparative process was conducted utilizing the above described Group 15 catalyst under polymerization conditions. The catalyst was slurried in isopentane and added to the reactor utilizing isopentane as the comparative BDPA. At the line indicated on the graph, the inventive catalyst slurry comprising isohexane as the BDPA was utilized. As is apparent in the graph, the bed weight of the reactor increased 17% (from 620 lbs to 725 lbs), indicating an improvement in the bulk density of the polymer product.

Figure 4:
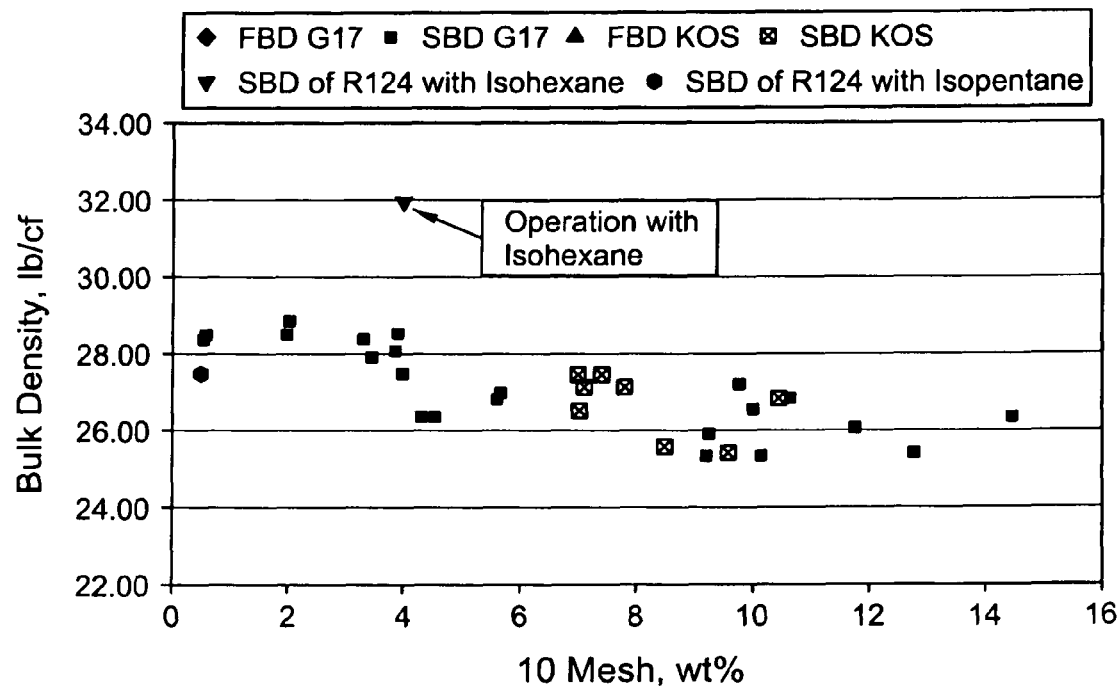
FIG. 4 is a graph illustrating the improvement in bulk density in an embodiment of the instant invention.

As shown in FIG. 4, the bulk density of the comparative polymer product utilizing isopentane was between 25 and 29 lbs/ft³. However, upon introduction of isohexane as the BDPA, the bulk density of the polymer increased 7 to 28% (to 32 lbs/ft³) relative to the comparative isopentane.

For purposes herein the bulk density may be measured as the settled bulk density, determined by gently pouring the polymer resin through a standard powder funnel into a stainless standard cylinder and determining the weight of the resin for the given volume of the filled cylinder consistent with ASTM D1895B or equivalent.

Figure 5:
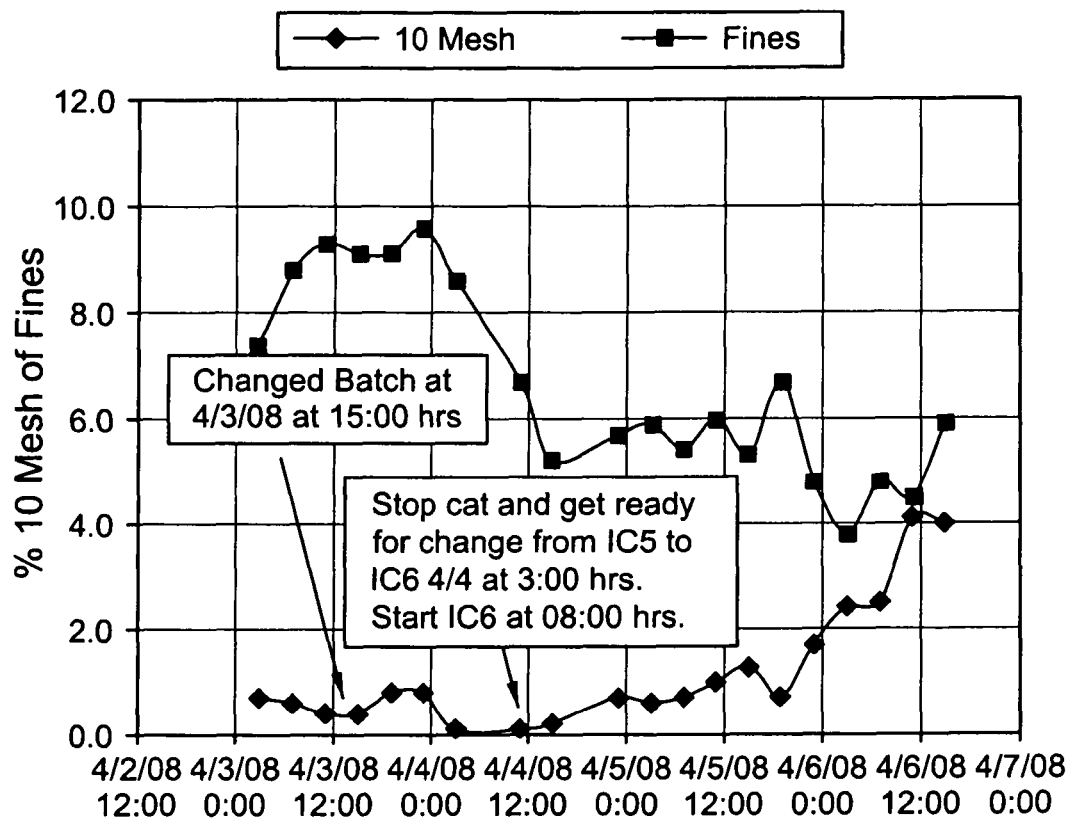
FIG. 5 is a graph illustrating the improvement in fine production, and the improvement in 10 mesh particle production in an embodiment of the instant invention.

As shown in FIG. 5, the fines concentration in the polymer product was also reduced from about 9% down to about 5% upon the introduction of the inventive BDPA. In addition, the concentration of >10 Mesh particles increased from less than 1 up to about 4% according to the instant invention.

Advantageously, embodiments of the present invention may provide for a polymerization process which minimizes the void space in the formed polymer particles and thus maximizes the granular particle density, without significantly affecting the activity of the catalysts. Other embodiments of the present invention may allow for an increase in reactor inventory, higher production capacity, and a process which may either improve or eliminate costly pelleting procedures. Furthermore, various embodiments may allow for a process by which a polymer having a predetermined density is selected.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A gas phase polymerization process comprising the steps of:
    passing a recycle stream through a fluidized bed in a gas phase fluidized bed reactor in the presence of a bulk density promoting agent, wherein the bulk density promoting agent is comprised of a saturated hydrocarbon and/or a non-polymerizable unsaturated hydrocarbon having 6 or more carbon atoms;
    polymerizing at least one alpha-olefin monomer in the presence of a catalyst to produce an alpha-olefin polymer; and
    controlling an amount of the bulk density promoting agent in the reactor such that a bulk density of the alpha-olefin polymer discharged from the reactor is greater than or equal to about 480 kg/m³, wherein the concentration of the bulk density promoting agent in the reactor is in the range of 0.5 to 50 vol %, based on the total amount of material in the reactor.

2. The process of claim 1, wherein the at least one alpha-olefin monomer is selected from the group consisting of ethylene, propylene, butene, hexene, octene, and mixtures thereof 3. The process of any of claims 1-2, wherein the bulk density promoting agent is a C6 to C10 saturated or non-polymerizable unsaturated hydrocarbon.

4. The process of any of claims 1-3, wherein the bulk density promoting agent is selected from the group consisting of n-hexane, isohexane, n-heptane, n-octane, isooctane, and mixtures thereof 5. The process of any of claims 1-4, wherein the catalyst comprises a Group 15 containing bidentate or tridentate ligated Group 3 to 7 metal compound wherein the Group 3 to 7 metal atom is bound to at least one leaving group and to at least two Group 15 atoms, and wherein at least one of the at least two Group 15 atoms is bound to a Group 15 or 16 atom through a bridging group.

6. The process of claim 5, wherein the metal in the Group 15 containing metal compound is a Group 4 to 6 metal.

7. The process of claim 5, wherein the bridging group is selected from the group consisting of a $C_1$ to $C_{20}$ hydrocarbon group, a heteroatom containing group, silicon, germanium, tin, lead, and phosphorus.

8. The process of claim 5, wherein the Group 15 or 16 atom may also be bound to nothing, a hydrogen, a Group 14 atom containing group, a halogen, or a heteroatom containing group, and wherein each of the two Group 15 atoms are also bound to a cyclic group and may optionally be bound to hydrogen, a halogen, a heteroatom, a hydrocarbyl group, or a heteroatom containing group.

9. The process of claim 5 wherein the Group 15 containing metal compound is represented by the formula:

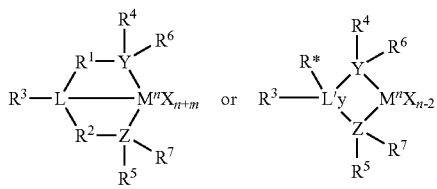

wherein M is a Group 4, 5 or 6 metal;
each X is independently a leaving group;
y is 0 or 1;
n is the oxidation state of M;
m is the formal charge of the ligand comprising the YZL or YZL' groups;
L is Nitrogen;
L' is a Group 15 or 16 element or Group 14 containing group;
Y is Nitrogen;
Z is Nitrogen;
$R^1$ and $R^2$ are independently a $C_1$ to $C_{20}$ hydrocarbon group, a heteroatom containing group having up to twenty carbon atoms, silicon, germanium, tin, lead, or phosphorus; wherein $R^1$ and $R^2$ may be interconnected to each other;
$R^3$ is absent or a hydrocarbon group, hydrogen, a halogen, a heteroatom containing group;
$R^4$ and $R^5$ are independently an alkyl group, an aryl group, substituted aryl group, a cyclic alkyl group, a substituted cyclic alkyl group, a cyclic arylalkyl group, a substituted cyclic arylalkyl group or a multiple ring system; wherein
$R^4$ and $R^5$ may be interconnected to each other;
$R^6$ and $R^7$ are independently absent, hydrogen, an alkyl group, halogen, heteroatom or a hydrocarbyl group; and R* is absent, hydrogen, a Group 14 atom containing group, a halogen, or a heteroatom containing group.

10. The process of claim 9, wherein $R^4$ and $R^5$ are represented by the formula:

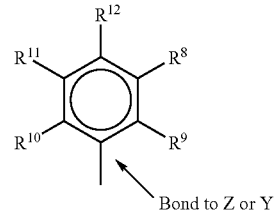

Bond to Z or Y wherein $R^8$ to $R^{12}$ are each independently hydrogen, a $C_1$ to $C_{40}$ alkyl group, a halide, a heteroatom, or a heteroatom containing group containing up to 40 carbon atoms.

11. The process of claim 10, wherein $R^8$ to $R^{12}$ are independently a methyl, ethyl, propyl or butyl group and X is a substituted aryl group having greater than 10 carbon atoms.

12. The process of claim 11, wherein $R^8$ to $R^{12}$ are methyl groups, and X is an alkyl substituted with an aryl group.

13. The process of claim 9, wherein L, Y, and Z are nitrogen, $R^1$ and $R^2$ are a hydrocarbon radical, $R^3$ is hydrogen, and $R^6$ and $R^7$ are absent.

14. The process of claim 9, wherein L and Z are independently nitrogen and $R^6$ and $R^7$ are absent.

15. The process of claim 1 wherein the catalyst comprises an activator.

16. The process of claim 1, wherein the bulk density promoting agent comprises at least 0.5 mol % of the recycle stream.

17. The process of claim 1, wherein the bulk density promoting agent comprises at least 1.5 mol % of the recycle stream.

18. The process of claim 1, wherein at least a portion of the bulk density promoting agent exists in the fluidized bed reactor as a gas.

19. The process of claim 1, wherein the alpha-olefin polymer has a bulk density of greater than or equal to about 500 kg/m³.

20. The process of claim 1, wherein the alpha-olefin polymer has a bulk density of greater than or equal to about 510 kg/m³.

21. The process of claim 1, wherein the alpha-olefin polymer has less than or equal to about 6% fines, based on the total amount of polymer produced.

22. The process of claim 1, wherein the 10 Mesh granules of the alpha-olefin polymer are present at greater than or equal to about 2 wt %, based on the total amount of polymer produced.

* * * * *